United States Patent
Rehman et al.

(10) Patent No.: US 12,044,657 B2
(45) Date of Patent: Jul. 23, 2024

(54) SYSTEM AND METHOD FOR POSITION TRACKING OF A CRAWLER ON A STRUCTURE

(71) Applicant: Saudi Arabian Oil Company, Dhahran (SA)

(72) Inventors: Aziz Rehman, Dhahran (SA); Fadl Abdellatif, Thuwal (SA); Sahejad Patel, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 364 days.

(21) Appl. No.: 17/450,342

(22) Filed: Oct. 8, 2021

(65) Prior Publication Data
US 2023/0110540 A1     Apr. 13, 2023

(51) Int. Cl.
| G01N 29/265 | (2006.01) |
| B60B 19/00  | (2006.01) |
| G01N 29/26  | (2006.01) |
| G01N 29/44  | (2006.01) |

(52) U.S. Cl.
CPC ......... *G01N 29/265* (2013.01); *B60B 19/006* (2013.01); *G01N 29/26* (2013.01); *G01N 29/44* (2013.01); *G01N 29/4445* (2013.01); *G01N 2291/0234* (2013.01); *G01N 2291/0289* (2013.01); *G01N 2291/2636* (2013.01)

(58) Field of Classification Search
CPC ......... B60B 19/006; G01N 2291/2636; G01N 2291/0234; G01N 29/4445; G01N 29/44; G01N 29/265
USPC .......................................................... 701/23
See application file for complete search history.

(56) References Cited

U.S. PATENT DOCUMENTS

| 6,021,363 | A   | 2/2000  | Nishikawa et al.          |
| 10,545,121 | B2 | 1/2020  | Fruch et al.              |
| 10,698,412 | B2 | 6/2020  | Loosararian et al.        |
| 11,584,458 | B2* | 2/2023 | Abdellatif ............... B64C 39/02 |
| 11,826,616 | B2* | 11/2023 | Legg ..................... G05D 1/0094 |
| 2014/0152803 | A1* | 6/2014 | Carlson ................. B60B 19/003 348/84 |
| 2016/0240298 | A1* | 8/2016 | Troy ..................... H01F 7/0257 |
| 2018/0080905 | A1* | 3/2018 | Al Nahwi ................ B63G 8/14 |
| 2019/0300135 | A1* | 10/2019 | Troy ..................... G03B 17/48 |

(Continued)

FOREIGN PATENT DOCUMENTS

| CN | 112068568 A | 12/2020 |
| CN | 212459606 U | 2/2021 |
| WO | 199932902 A1 | 7/1999 |

OTHER PUBLICATIONS

Chae hyeuk Lee et al.; Elbow detection for localization of a mobile robot inside pipeline using laser pointers; Nov. 2, 2013.

(Continued)

*Primary Examiner* — Yazan A Soofi
(74) *Attorney, Agent, or Firm* — Leason Ellis LLP

(57) ABSTRACT

A crawler maps a structure by moving at least longitudinally or circumferentially on the structure. A probe scans the structure to generate scan data corresponding to the structure. A distance measuring unit measures a distance of the probe from a landmark extending circumferentially around the structure. An orientation sensor determines an orientation of the crawler on the structure. A processor generates a map of the scan data of the structure indexed by the distance and orientation.

20 Claims, 3 Drawing Sheets

(56) References Cited

U.S. PATENT DOCUMENTS

| | | | |
|---|---|---|---|
| 2020/0111222 A1* | 4/2020 | Asmari | G06V 20/182 |
| 2020/0174478 A1* | 6/2020 | Abdellatif | B62D 21/09 |
| 2020/0264333 A1 | 8/2020 | Wittaker et al. | |
| 2021/0062954 A1* | 3/2021 | Du | G01M 3/005 |
| 2021/0071801 A1* | 3/2021 | Lisnyak | G01N 21/952 |
| 2023/0003687 A1* | 1/2023 | Vaganay | F17C 13/12 |

OTHER PUBLICATIONS

Briana Jones; Municipal Sewer & Water; Pipeline Inspection, Surveying and Mapping; Jul. 31, 2012.

LiDAR Pipe; Mar. 29, 2021.

Office Action in corresponding Saudi Arabian Application No. 122440338 mailed Sep. 28, 2023.

* cited by examiner

SYSTEM AND METHOD FOR POSITION TRACKING OF A CRAWLER ON A STRUCTURE

FIELD OF THE DISCLOSURE

The present disclosure relates generally to scanning of a structure, and, more particularly, to a crawler which maps scan data of the structure.

BACKGROUND OF THE DISCLOSURE

Periodic inspection of pipes and vessels is extremely important to check their health and make sure proactive measures are taken before a failure happens. The most common inspection is thickness measurement of the pipe's wall thickness which can detect internal corrosion. Typically, an inspector manually operates a handheld ultrasound testing (UT) probe and moves it around across a certain area of the pipe to find the spot of least thickness. The location of faulty areas with low thicknesses are usually marked with paint/marker and labeled for future refencing; either for repair or for re-inspection after a certain time period. This kind of manual labeling is less than ideal and can lead to confusion especially if a different inspector comes to inspect the same area in the future.

Alternatively, automated and robotic scanning can methodically scan the whole pipe surface and report complete maps of thickness measurements for every point on the surface. A magnetic crawler can do this kind of scanning and can provide full coverage for the whole surface. Typically, crawlers are equipped with relative position sensors such as wheel encoders. These can be used to provide a location for each thickness measurement with respect to the starting location of the crawler. A 2D heatmap representing the whole pipe surface can then be constructed for the inspected area showing spots of low thickness.

Unfortunately, using relative positioning sensors generates a heatmap referenced with respect to an arbitrary starting point rather than a global reference such as static landmarks on the pipe including flanges, valves, welds, and support structures. This makes it difficult to exactly pinpoint the location of a fault. In addition, the accuracy of relative position sensors typically suffers from drifting errors where accumulation of error while moving can lead to a significant deviation from the true position leading to inaccurate correlation between thickness measurements and positions.

A naïve solution is to use a GPS sensor on the crawler to find its global location at any point in time. However, GPS typically does not provide millimeter level resolution and suffers from large drift errors. Moreover, GPS-denied environments exist where GPS cannot be relied upon either due to excessive overhead obstacles, reflections on building walls, or indoor environments. For these reasons, GPS is unsuitable for global referencing needed for the accurate mapping of structures.

SUMMARY OF THE DISCLOSURE

According to an embodiment consistent with the present disclosure, a crawler maps a structure by moving at least longitudinally or circumferentially on the structure. A probe scans the structure to generate scan data corresponding to the structure. A distance measuring unit measures a distance of the probe from a landmark extending circumferentially around the structure. An orientation sensor determines an orientation of the crawler on the structure. A processor generates a map of the scan data of the structure indexed by the distance and orientation.

In an embodiment, a crawler is configured to map a structure, with the crawler comprising: a chassis, a wheel connected to the chassis and configured to move the crawler at least longitudinally or circumferentially on the structure, a probe supported by the chassis and configured to scan the structure to generate scan data corresponding to the structure, a distance measuring unit fixedly supported by the chassis and configured to measure a distance of the probe from a landmark extending circumferentially around the structure, an orientation sensor fixedly supported by the chassis and configured to determine an orientation of the crawler on the structure, and a processor configured by code executing therein which correlates the scan data with the distance and the orientation, and which generates and outputs, to a receiver, a map of the correlated scan data of the structure indexed by the distance and orientation.

The distance measuring unit is selected from the group consisting of: an optical camera, a laser scanner, a one-dimensional (1D) light detection and ranging (LIDAR) device, a two-dimensional (2D) LIDAR device, an ultrasound rangefinder, an infrared (IR) depth camera, and a stereo-camera. The orientation sensor is a tilt sensor which detects a vertical and circumferential change of the orientation of the crawler about the structure. Alternatively, the orientation sensor is an inertial measurement unit (IMU) which detects a change in the orientation of the crawler along the structure. The landmark is a static member on the structure. Alternatively, the landmark is a beacon. The probe is an ultrasonic test (UT) probe configured to ultrasonically scan the structure. The wheel is a mecanum wheel. A portion of the structure can be ferromagnetic, and the wheel is magnetic with the wheel configured to retain the crawler on the ferromagnetic portion.

In another embodiment, a crawler is configured to map a structure, with the crawler comprising: a chassis, a wheel connected to the chassis and configured to move the crawler at least longitudinally or circumferentially on a structure, an ultrasonic probe supported by the chassis and configured to perform an ultrasonic test (UT) scan on the structure to generate UT scan data corresponding to the structure, a distance measuring unit fixedly supported by the chassis and configured to measure a distance of the probe from a landmark extending circumferentially around the structure, an orientation sensor fixedly supported by the chassis and configured to determine an orientation of the crawler on the structure, and an output device configured by code executing therein which generates and outputs, to a receiver, a map of the scan data of the structure indexed by the distance and orientation.

The distance measuring unit is selected from the group consisting of: an optical camera, a laser scanner, a one-dimensional (1D) light detection and ranging (LIDAR) device, a two-dimensional (2D) LIDAR device, an ultrasound rangefinder, an infrared (IR) depth camera, and a stereo-camera. The orientation sensor is a tilt sensor which detects a vertical and circumferential change of the orientation of the crawler about the structure. Alternatively, the orientation sensor is an inertial measurement unit (IMU) which detects a change in the orientation of the crawler along the structure. The landmark is a static member on the structure. Alternatively, the landmark is a beacon. The wheel is a mecanum wheel. A portion of the structure can be ferromagnetic, and the wheel is magnetic with the wheel configured to retain the crawler on the ferromagnetic portion.

In a further embodiment, a method is configured to map a structure using a crawler which comprises a chassis, a wheel connected to the chassis and configured to move the crawler at least longitudinally or circumferentially on the structure, a probe supported by the chassis, a distance measuring unit fixedly supported by the chassis, an orientation sensor fixedly supported by the chassis, and a processor configured by code executing therein.

The method comprises traversing the structure using the crawler; measuring, by the distance measuring unit, a distance of the probe relative to a landmark extending circumferentially around the structure; determining, by the orientation sensor, an orientation of the crawler on the structure; performing, by the probe, a scan of the structure; generating scan data corresponding to the structure; correlating, by the processor, the scan data with the distance and the orientation; and outputting, by the processor, a map of the scan data to a receiver, with the scan data indexed by the distance and orientation. The distance measuring unit is selected from the group consisting of: an optical camera, a laser scanner, a one-dimensional (1D) light detection and ranging (LIDAR) device, a two-dimensional (2D) LIDAR device, an ultrasound rangefinder, an infrared (IR) depth camera, and a stereo-camera. The orientation sensor is a tilt sensor or an inertial measurement unit (IMU).

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a crawler 10 which maps a structure 30 by moving at least longitudinally or circumferentially on the structure 30. Scan data of the structure 30 is mapped and indexed by distance and orientation relative to a fixed landmark on the structure 30.

Figure 1:
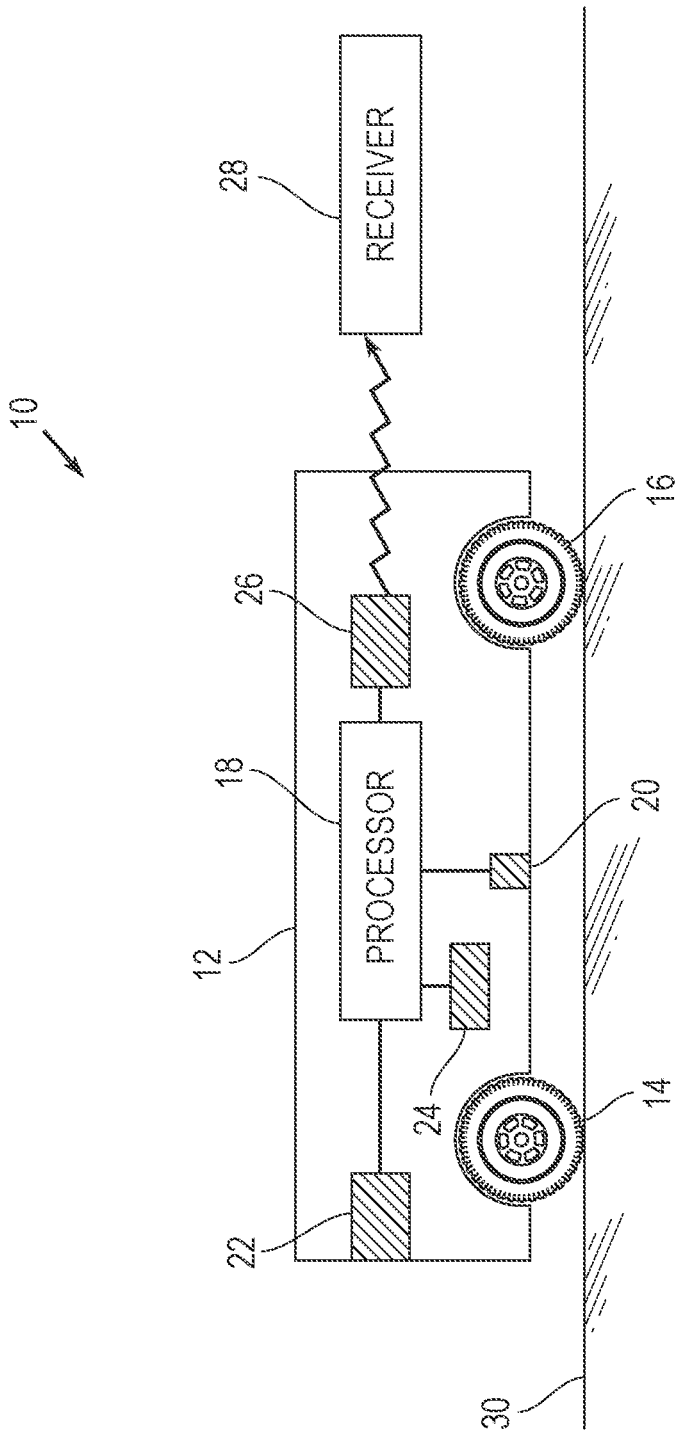
FIG. 1 is a schematic cross-sectional diagram of a crawler, according to an embodiment.

Referring to FIG. 1, the crawler 10 is an automated device which can crawl on a structure 30 in an environment. The crawler 10 can then scan the structure 30. The crawler 10 can be an independent autonomous device. In an example embodiment, the crawler 10 can be a component of an unmanned aerial vehicle (UAV). The UAV can fly to the structure 30 in a flight mode, can land on the structure 30 in perch mode, and can crawl on the structure 30 in crawl mode to scan the structure 30. In a further embodiment, the UAV can include a detachable crawler, such as described in U.S. Patent Publication No. US 2020/0174129 A1, which is incorporated herein by reference.

Figure 2:
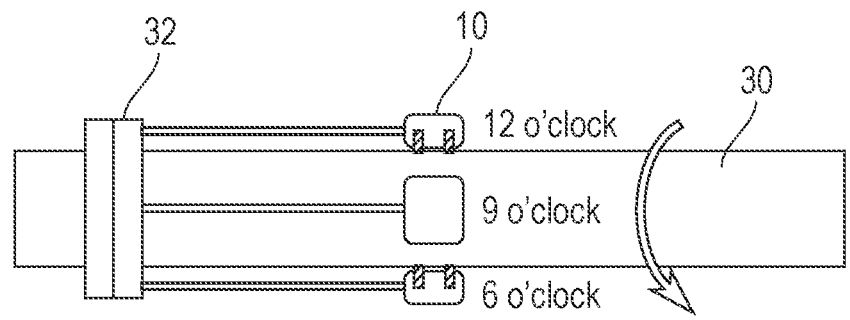
FIG. 2 illustrates the crawler of FIG. 1 moving circumferentially on a horizontal structure.
Figure 3:
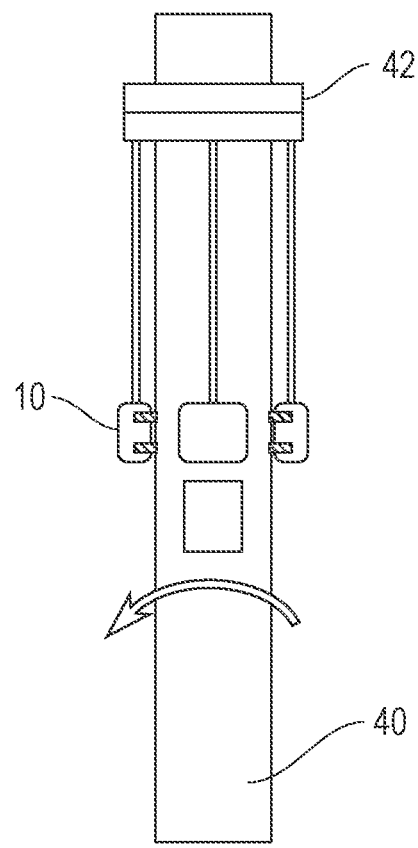
FIG. 3 illustrates the crawler of FIG. 1 moving circumferentially on a vertical structure.

Referring again to FIG. 1, the crawler 10 includes a chassis 12, at least one wheel 14, 16, a processor 18, a probe 20, a distance measuring unit 22, an orientation sensor 24, and a transmitter 26. The at least one wheel 14, 16 is connected to the chassis 12. The at least one wheel 14, 16 can be a mecanum wheel. In another embodiment, a portion of the structure 30 can be ferromagnetic, and the at least one of the wheels 14, 16 can be magnetic. The magnetic attraction of the at least one wheel 14, 16 to the structure 30 can be due to a permanent magnet in the wheel 14, 16. Alternatively, the magnetic attraction can be due to an electromagnet in the wheel 14, 16, which can be activated by the processor 18 and obtaining electrical power from a power source within the chassis 12. Accordingly, the wheel 14, 16 can be configured to retain the crawler 10 on the ferromagnetic portion of the structure 30. For example, portions of the structure 30 can be curved, as shown in FIG. 2, or can be vertical, as shown in FIGS. 2-3. Therefore, the use of magnetic attraction of at least one wheel 14, 16 to the structure 30 can increase the stability of the crawler 10 on the structure 30.

The at least one wheel 14, 16 is configured to move the crawler 10 at least longitudinally or circumferentially on the structure 30. The probe 20 is supported by the chassis 12 and is configured to scan the structure 30 to generate scan data corresponding to the structure 30. The scan data can be a measure the thickness of the structure 30, such as the thickness of a wall of a pipe as the structure 30. The scan data can also indicate a fault in the surface of the structure 30, such as a crack. The scan data can also be a measure of an amount of corrosion of a portion of the surface of the structure 30. Alternatively, the probe 20 can be any known type of probe, such as an ultrasonic probe. Accordingly, the scan data can correspond to other known measurements of the structure 30.

The distance measuring unit 22 is fixedly supported by the chassis 12 and is configured to measure a distance of the probe 20 from a landmark extending circumferentially around the structure 30, such as the landmarks 32, 42 shown in FIGS. 2-3, respectively. The landmarks 32, 42, can be a flange, a weld, or any type of landmark extending circumferentially around the structure 30. The orientation sensor 24 is fixedly supported by the chassis 12 and is configured to determine an orientation of the crawler 10 on the structure 20. The processor 18 is configured by code executing therein to correlate the scan data with the distance and the orientation. The processor 18 generates and outputs, to a receiver 28, a map of the correlated scan data of the structure indexed by the distance and orientation. The processor 18 can output the map using the transmitter 26. The transmitter 26 can be a wireless transmitter. Accordingly, the receiver 28 can be a wireless receiver which can communicate with the transmitter 26 using any known wireless communication protocol.

The distance measuring unit 22 can be any known device for measuring a distance to a landmark 32, 42, as in FIGS. 2-3, respectively. For example, the distance measuring unit 22 is selected from the group consisting of: an optical camera, a laser scanner, a one-dimensional (1D) light detection and ranging (LIDAR) device, a two-dimensional (2D) LIDAR device, an ultrasound rangefinder, an infrared (IR) depth camera, and a stereo-camera. The landmark 32, 42 can be a static member disposed on the structure 30. Alternatively, the landmark 32, 42 can be a stationary beacon. As shown in FIGS. 2-3, the landmark 32, 42 can extend circumferentially around the structure 30. Accordingly, as shown in FIGS. 2-3, the crawler 10 can measure and record an approximately constant distance of the crawler 10 from the circumferentially-extending landmark 32, 42 using the distance measuring unit 22.

The orientation sensor 24 can be a tilt sensor which can a vertical and circumferential change of the orientation of the crawler about the structure, as shown in FIG. 2. For example, as the crawler 10 moves from the 12 o'clock position on the structure 30 to the 9 o'clock position, and then to the 6 o'clock position, the tilt sensor measures and records the vertical and circumferential change of the orientation of the crawler 10. Alternatively, the orientation sensor 24 can be an inertial measurement unit (IMU) which detects a change in the orientation of the crawler 10 along the structure 30, as shown in motion of the crawler 10 in either FIG. 2 or FIG. 3.

Using the measured distance and orientation of the crawler 10, the processor 18 correlates the scan data at the location corresponding to the distance and orientation. The processor 18 then generates a map of the correlated scan data of the structure indexed by the distance and orientation. As described above, the map is then output by the processor 18 to the transmitter 26. The transmitter 26 then outputs the map to the receiver 28. The receiver 28 can be connected to a memory configured to store the map of the correlated scan data of the structure indexed by the distance and orientation. In addition, the receiver 28 can be connected to a computer with its own processor and a display, with the computer processor capable of generating a heatmap of the scan data from the received map. The heatmap can then be displayed on the display to illustrate thicknesses, corrosion, or other scanned characteristics of the structure 30.

Figure 4:
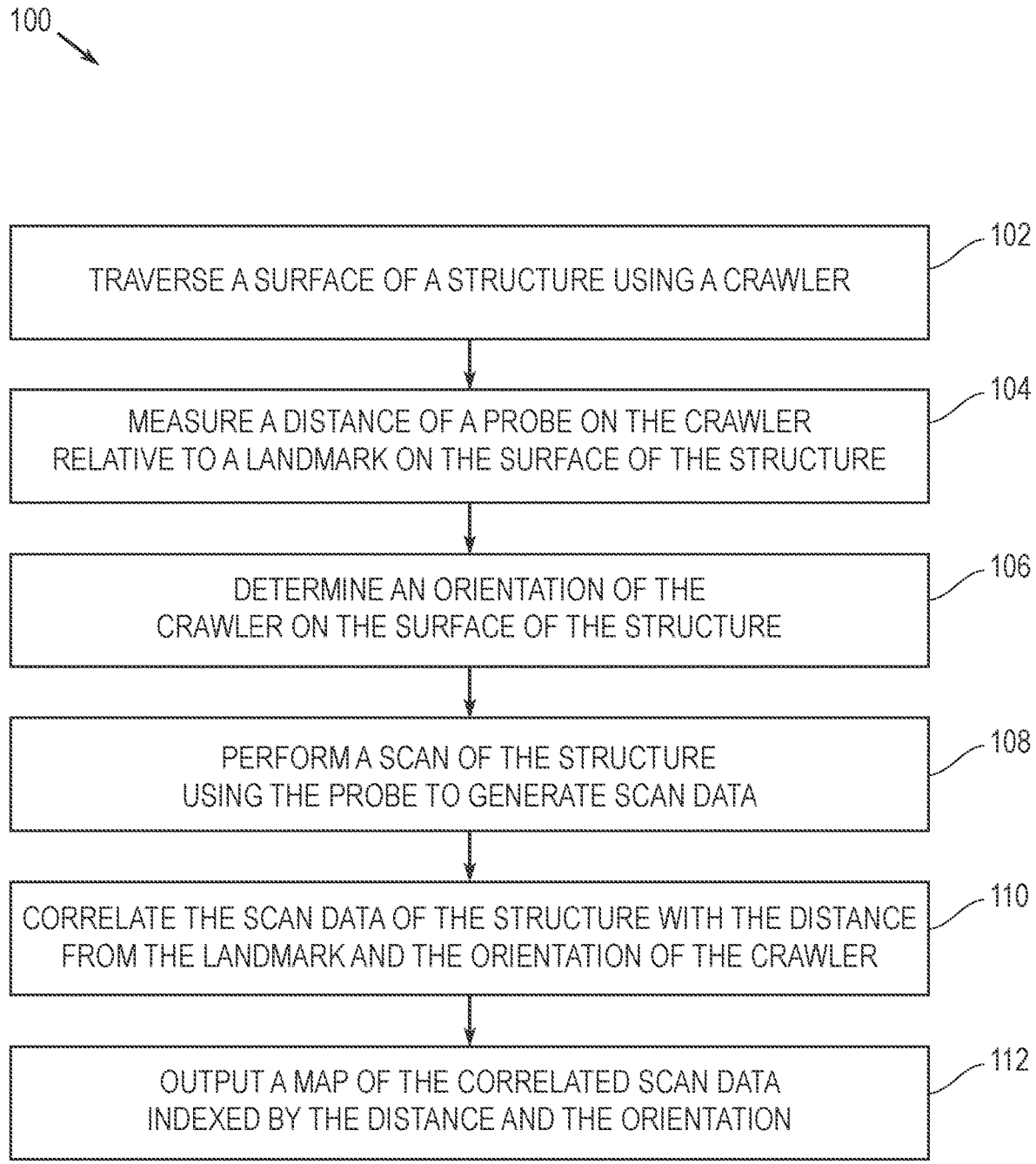
FIG. 4 is a flowchart of a method of operation of the crawler of FIG. 1.

Referring to FIG. 4, a method 100 includes traversing the structure 30 using the crawler 10 in step 102, measuring a distance of the probe 20 relative to a landmark 32, 42 extending circumferentially around the structure 30 using the distance measuring unit 22 in step 104, and determining an orientation of the crawler 10 on the structure 30 using the orientation sensor 24 in step 106. The method 100 then performs a scan of the structure 30 by the probe 20 in step 108 to generate scan data corresponding to the structure 30, and correlates the scan data with the distance and the orientation using the processor 18 in step 110. The method 100 then outputs by the processor 18, using the transmitter 26, a map of the scan data to a receiver 28 in step 112, with the scan data indexed by the distance and orientation.

Portions of the methods described herein can be performed by software or firmware in machine readable form on a tangible (e.g., non-transitory) storage medium. For example, the software or firmware can be in the form of a computer program including computer program code adapted to cause the crawler to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A crawler configured to map a structure, comprising:
    a chassis;
    a wheel connected to the chassis and configured to move the crawler at least longitudinally or circumferentially on the structure;
    a probe supported by the chassis and configured to scan the structure to generate scan data corresponding to the structure;
    a distance measuring unit fixedly supported by the chassis and configured to measure a distance of the probe from a landmark extending circumferentially around the structure;

an orientation sensor fixedly supported by the chassis and configured to determine a circumferential change of an orientation of the crawler about the structure; and a processor configured by code executing therein which correlates the scan data with the distance and the orientation, and which generates and outputs, to a receiver, a map of the correlated scan data of the structure indexed by the distance and orientation.

2. The crawler of claim 1, wherein the distance measuring unit is selected from the group consisting of: an optical camera, a laser scanner, a one-dimensional (1D) light detection and ranging (LIDAR) device, a two-dimensional (2D) LIDAR device, an ultrasound rangefinder, an infrared (IR) depth camera, and a stereo-camera.

3. The crawler of claim 1, wherein the orientation sensor is a tilt sensor, and
wherein the tilt sensor detects a vertical and circumferential change of the orientation of the crawler about the structure.

4. The crawler of claim 1, wherein the orientation sensor is an inertial measurement unit (IMU), and
wherein the IMU detects a change in the orientation of the crawler along the structure.

5. The crawler of claim 1, wherein the landmark is a static member on the structure.

6. The crawler of claim 1, wherein the landmark is a beacon.

7. The crawler of claim 1, wherein the probe is an ultrasonic test (UT) probe configured to ultrasonically scan the structure.

8. The crawler of claim 1, wherein the wheel is a mecanum wheel.

9. The crawler of claim 1, wherein a portion of the structure is ferromagnetic, and
wherein the wheel is magnetic with the wheel configured to retain the crawler on the ferromagnetic portion.

10. A crawler configured to map a structure, comprising:
a chassis;
a wheel connected to the chassis and configured to move the crawler at least longitudinally or circumferentially on a structure;
an ultrasonic probe supported by the chassis and configured to perform an ultrasonic test (UT) scan on the structure to generate UT scan data corresponding to the structure;
a distance measuring unit fixedly supported by the chassis and configured to measure a distance of the probe from a landmark extending circumferentially around the structure;
an orientation sensor fixedly supported by the chassis and configured to determine a circumferential change of an orientation of the crawler on about the structure; and
an output device configured by code executing therein which generates and outputs, to a receiver, a map of the scan data of the structure indexed by the distance and orientation.

11. The crawler of claim 10, wherein the distance measuring unit is selected from the group consisting of: an optical camera, a laser scanner, a one-dimensional (1D) light detection and ranging (LIDAR) device, a two-dimensional (2D) LIDAR device, an ultrasound rangefinder, an infrared (IR) depth camera, and a stereo-camera.

12. The crawler of claim 10, wherein the orientation sensor is a tilt sensor, and
wherein the tilt sensor detects a vertical and circumferential change of the orientation of the crawler about the structure.

13. The crawler of claim 10, wherein the orientation sensor is an inertial measurement unit (IMU), and
wherein the IMU detects a change in the orientation of the crawler along the structure.

14. The crawler of claim 10, wherein the landmark is a static member on the structure.

15. The crawler of claim 10, wherein the landmark is a beacon.

16. The crawler of claim 10, wherein the wheel is a mecanum wheel.

17. The crawler of claim 10, wherein a portion of the structure is ferromagnetic, and
wherein the wheel is magnetic with the wheel configured to retain the crawler on the ferromagnetic portion.

18. A method configured to map a structure, comprising:
traversing the structure using a crawler, wherein the crawler comprises:
a chassis;
a wheel connected to the chassis and configured to move the crawler at least longitudinally or circumferentially on the structure;
a probe supported by the chassis;
a distance measuring unit fixedly supported by the chassis;
an orientation sensor fixedly supported by the chassis; and
a processor configured by code executing therein;
measuring, by the distance measuring unit, a distance of the probe relative to a landmark extending circumferentially around the structure;
determining, by the orientation sensor, a circumferential change of an orientation of the crawler about the structure;
performing, by the probe, a scan of the structure;
generating scan data corresponding to the structure;
correlating, by the processor, the scan data with the distance and the orientation; and
outputting, by the processor, a map of the scan data to a receiver, with the scan data indexed by the distance and orientation.

19. The method of claim 18, wherein the distance measuring unit is selected from the group consisting of: an optical camera, a laser scanner, a one-dimensional (1D) light detection and ranging (LIDAR) device, a two-dimensional (2D) LIDAR device, an ultrasound rangefinder, an infrared (IR) depth camera, and a stereo-camera.

20. The method of claim 18, wherein the orientation sensor is a tilt sensor or an inertial measurement unit (IMU).

* * * * *